United States Patent [19]

Yoshioka

[11] 4,300,808

[45] Nov. 17, 1981

[54] TILTING-PAD BEARINGS

[75] Inventor: Masahiro Yoshioka, Ibaraki, Japan

[73] Assignee: Hitachi, Ltd., Tokyo, Japan

[21] Appl. No.: 136,491

[22] Filed: Apr. 3, 1980

[30] Foreign Application Priority Data

Apr. 6, 1979 [JP] Japan .................................. 54-41082

[51] Int. Cl.³ ............................................ F16C 17/03
[52] U.S. Cl. ......................................... 308/76; 308/9;
308/73; 308/DIG. 1; 308/DIG. 4
[58] Field of Search ....................... 308/9, 73, 76, 122,
308/DIG. 1, DIG. 4

[56] References Cited

U.S. PATENT DOCUMENTS

| | | | |
|---|---|---|---|
| 3,004,804 | 10/1961 | Pinkus et al. | 308/73 |
| 3,549,215 | 12/1970 | Hollingsworth | 308/73 |
| 3,671,137 | 6/1972 | Ball | 308/9 |
| 3,807,814 | 4/1974 | Stopp | 308/73 |
| 4,097,094 | 6/1978 | Gardner | 308/9 |

FOREIGN PATENT DOCUMENTS 957087  1/1957  Fed. Rep. of Germany ........ 308/73

OTHER PUBLICATIONS

"A Study on the Dynamic Characteristics of High Speed Journal Bearings," The Hitachi Zosen Technical Review, vol. 38, No. 4, Dec. 1977, pp. 30–37.

*Primary Examiner*—James E. Bryant, III
*Attorney, Agent, or Firm*—Craig and Antonelli

[57] ABSTRACT

There is disclosed a tilting-pad bearing comprising a plurality of bearing pads tiltably disposed in surface contact at their arcuate outer peripheral surfaces with an inner surface of the bearing support, pad positioning members for positioning circumferential ends of adjacent bearing pads, the pad positioning members being provided on the pad support so as to be positioned between the bearing pads, oil supply ports provided in and longitudinally of the pad positioning members, and oil outlet grooves provided in parallel with the axis of the rotary shaft adjacent to the pad positioning members of the pad support.

4 Claims, 5 Drawing Figures

TILTING-PAD BEARINGS

BACKGROUND OF THE INVENTION

1. Field of the Invention

This invention relates to a tilting-pad bearing or a bearing having a plurality of tilting-pads.

2. Description of the Prior Art

A tilting-pad bearing is arranged such that a plurality of bearing pads are tiltably supported at center portions of their outer peripheries by pivot means and disposed about a periphery of a rotary shaft so as to define bearing spaces between the bearing pads and the outer periphery of the rotary shaft, fluid being sucked by the action of rotation of the rotary shaft into the bearing spaces to urge an inlet ends of the bearing pads thereby causing the bearing spaces to be shaped into a wedge-like configuration in section, and the fluid being flowed by the wedge action into the wedge-like bearing spaces to form a fluid film having a high pressure so that the rotary shaft is floated and supported by the fluid film. Such a tilting-pad bearing is described in, for example, a Japanese journal of "THE HITACHI ZOSEN TECHNICAL REVIEW," 1977, Vol. 38, No. 4.

In general, the tilting-pad bearing of the kind specified above is provided with seal members on side portions of the bearing pads to facilitate the entry of the lubricating fluid into the spaces between the shaft and the bearing pads. However, when the shaft rotates at a high speed, not only the mechanical loss is increased by the lubricating fluid existing in narrow gaps between the seal members and the shaft, but also heat generated in these portions is transferred through the lubricating fluid to the bearing pads to raise the temperature of the bearing fluid film, thereby resulting in the risks that seizure is caused and that the reliability is lowered. Moreover, in such a tilting-pad bearing, there must be provided the seal members, and spherical couplings or pin connections are utilized as pivot means for determining the tilting position of the bearing pads and thus the parts are increased in number and the construction is complicate.

OBJECT OF THE INVENTION

An object of the present invention is to provide a tilting-pad bearing capable of minimising the increase in the temperature of the bearing fluid film.

It is another object of the present invention to provide a tilting-pad bearing which is provided with a pad positioning means to achieve a good supply of the lubricating fluid to the bearing pads.

It is a further object of the present invention to provide a tilting-pad bearing having a simple construction and a reduced number of parts.

In order to achieve the objects mentioned above, the tilting-pad bearing of the present invention comprises a bearing support member, a plurality of bearing pads tiltably disposed in surface contact at their arcuate outer peripheral surfaces with an inner surface of the bearing support, pad positioning members provided on the pad support so as to be positioned between said bearing pads for positioning circumferential ends of adjacent bearing pads, oil supply ports provided in and longitudinally of the pad positioning members and oil outlet grooves provided in parallel with the axis of the rotary shaft adjacent to the pad positioning members of the pad support.

Features, objects and advantages of the present invention other than the above will become apparent from the description of the embodiment given below by reference to the accompanying drawings.

DESCRIPTION OF THE PREFERRED EMBODIMENT

Figure 1:
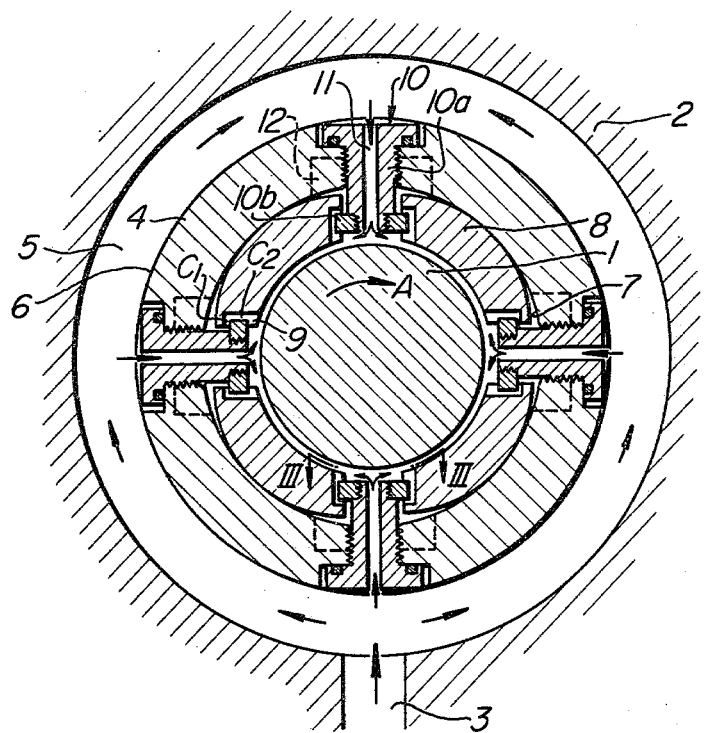
FIG. 1 is a cross-sectional view showing an embodiment of a tilting-pad bearing of the present invention.
Figure 2:
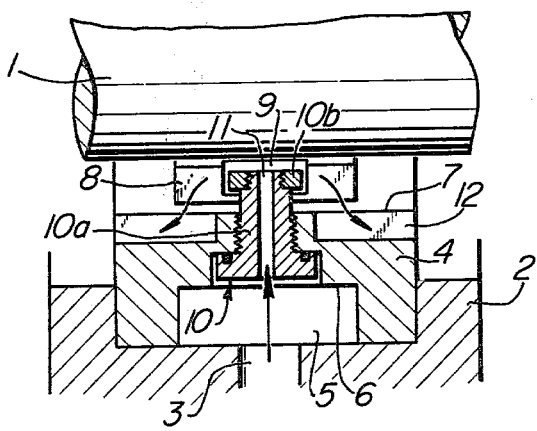
FIG. 2 is a longitudinal sectional view thereof.
Figure 3:
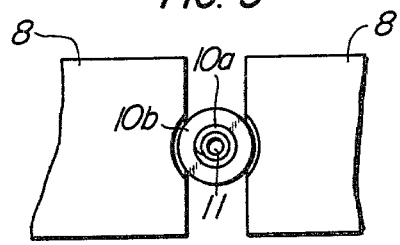
FIG. 3 is a view taken along the line III—III in FIG. 1.

FIGS. 1 to 3 show an embodiment of the tilting-pad bearing of the present invention, and in the drawings, the reference numeral 1 designates a rotary shaft and 2 designates a housing. The housing 2 includes a hole 3 for supplying a lubricating fluid. A generally cylindrical pad support 4 is secured to the housing 2 and formed on its outer periphery with a circumferential groove 6 for providing together with the housing 2 an annular fluid passage 5 in communication with the hole 3. Provided on an inner surface 7 of the pad support 4 is a plurality of bearing pads 8 for supporting the rotary shaft 1. In this embodiment, there are provided four such bearing pads 8. Each of the bearing pads 8 is in surface contact at its arcuate outer surface with the inner surface 7 of the pad support 4 to be capable of causing its tilting movement relative to the pad support 4. Furthermore, the bearing pad 8 is formed at its circumferentially opposite ends with cut-away portions 9 for serving to determine the range of the tilting movements of and the position of the bearing pad 8. Disposed between adjacent pads 8 are pad positioning members 10 for determining the range of the tilting movements of and the position of the bearing pads 8, each of the pad positioning members 10 comprises a stud 10a which is in screw-threaded engagement with the pad support 4 to extend inwardly from the outer peripheral surface thereof so that its forward end is positioned between adjacent circumferential ends of the bearing pads 8 and a position defining member 10b which is in screw-threaded engagement with a forward end of the stud 10a and engageable with the cut-away portions 9 of adjacent bearing pads 8 with an axial gap $C_1$ and circumferential gap $C_2$ provided therebetween. By the provision of the gaps $C_1$, $C_2$ between the members 10b and the cut-away portions 9, the bearing pads 8 are tiltably movable within the range determined by the gaps $C_1$, $C_2$. An oil supply passage 11 is formed in the respective stud 10a of the pad positioning member 10 to extend axially therethrough, so that the lubricating fluid within the annular fluid passage 5 flows through the oil supply passage 11 into the space between the adjacent circumferential ends of the bearing pads. Oil outlet grooves 12 are provided in parallel with the axis of the rotary shaft 1 adjacent to the pad positioning members 10 of the pad support 4. The oil outlet grooves 12 serve to facilitate the discharge of the lubricating fluid from the gaps between the bearing pads without causing stagnation of the fluid therein.

The operation of the embodiment of the present invention described above will now be explained.

Under the condition that the lubricating fluid is being supplied through the oil supply passages 11, when the rotary shaft 1 rotates in a direction of an arrow A, the lubricating fluid flows under the wedge action into the spaces between the rotary shaft 1 and the inner peripheral surfaces of the bearing pads 8 to form a fluid film having a high pressure. By this fluid film the rotary shaft 1 is floated and supported. During the operation of supporting the rotary shaft 1 as mentioned above, the lubricating fluid which has passed through the oil supply passages 11 of the studs 10a flows smoothly into the spaces between the outer periphery of the rotary shaft 1 and the bearing pads 8, since the ends of the studs 10a of the pad positioning members 10 are positioned adjacent to the inner surfaces of the bearing pads 8. As a result, the bearing pads 8 can be efficiently cooled. The lubricating fluid which has participated in cooling the bearing pads 8 is discharged through the oil discharging grooves 12 without stagnation.

In this embodiment, bolts and nuts commercially sold can be used for the studs 10a and the position defining members 10b, and the oil supply passages 11 are formed in these bolts. With such arrangement, the manufacturing processes of the parts can be reduced.

Figure 4:
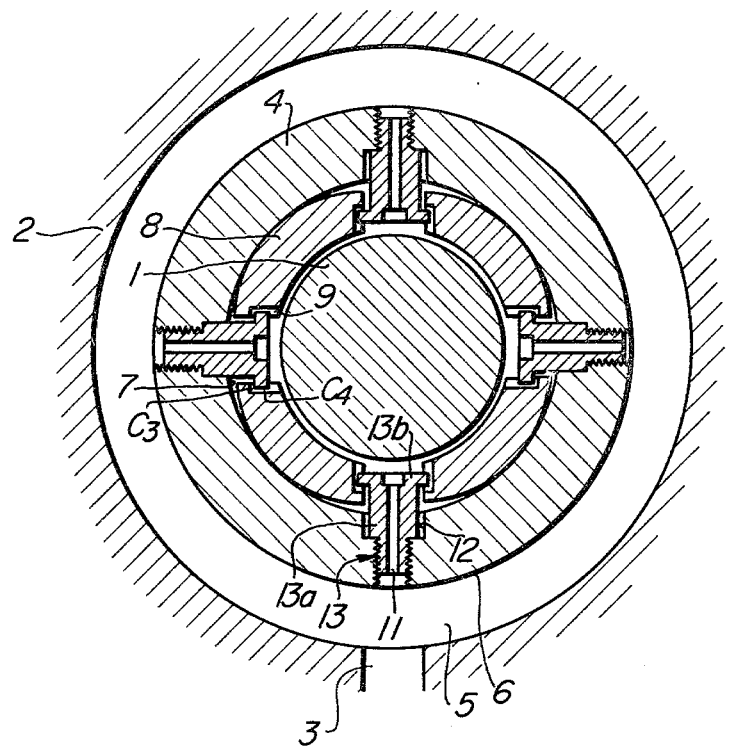
FIG. 4 is a cross-sectional view showing another embodiment of the tilting-pad bearing of the present invention.
Figure 5:
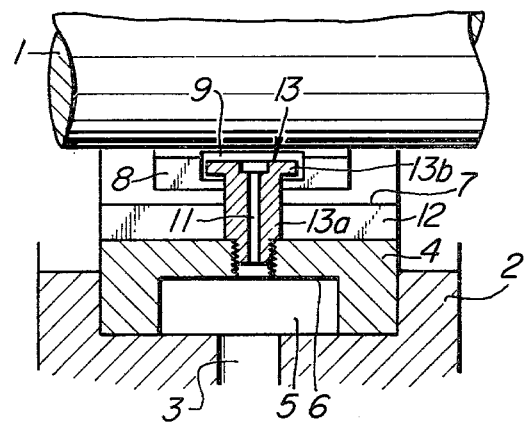
FIG. 5 is a longitudinal sectional view thereof.

FIGS. 4 and 5 show another embodiment of the tilting-pad bearing of the present invention and parts thereof designated in these drawings by the same reference numerals as those of FIGS. 1 to 3 are same as or equivalent to the parts of the first-mentioned embodiment and the description with regard to such parts is omitted. The reference numeral 13 designates pad positioning members each comprising a stud 13a in screw-threaded engagement with the pad support 4 to extend therethrough from the associated bearing pads 8 so as to be positioned between adjacent circumferential ends of the bearing pads 8 and a flange 13b integrally provided on an end of the stud 13a adjacent to the bearing pad 8 and engaged with the cut-away portions 9 of the bearing pads 8 with axial gaps $C_3$ and circumferential gaps $C_4$ provided therebetween for defining their position. Each of studs 13a of the pad positioning members 13 is formed with an axially extending oil supply passage 11. Bolts commercially sold can be used for the pad positioning members 13. With the arrangement, the bearing pads 8 can be tiltably moved within the range of gaps $C_3$, $C_4$.

The operation of this alternative embodiment of the present invention described above will now be explained.

By the rotation of the rotary shaft 1, the lubricating fluid flows from the oil supply passage 11 into the spaces between the outer peripheral surface of the rotary shaft 1 and the inner peripheral surfaces of the bearing pads 8 to form therebetween a fluid film having a high pressure. The rotary shaft 1 is supported by this fluid film. Since the flanges 13b of the pad positioning members 13 are positioned adjacent to the inner peripheral surfaces of the bearing pads 8, the fluid from the oil supply passages 11 is smoothly flowed into the inside of the inner peripheral surfaces of the bearing pads 8 thereby efficiently cooling the latter. The fluid which has participated in cooling the bearing pads 8 is discharged through the oil discharge grooves 12 without stagnation, so that the bearing pads 8 can further be efficiently cooled. Furthermore, this embodiment is advantageous in that the parts of the pad positioning members 13 can be reduced in number.

As described above, the present invention is arranged such that the pad positioning members for defining the position of the plurality of the bearing pads and positioning thereof are disposed between the adjacent circumferential ends of the bearing pads and the oil supply passages are formed in the pad positioning members, so that the construction is simple in comparison with conventional bearings. In the present invention, furthermore, the pad positioning members are positioned adjacent to the inner peripheral surfaces of the bearing pads thereby resulting in the facts that a good flow of the lubricating fluid into the inside of the bearing pads and that the fluid which has participated in lubricating the bearing pads is smoothly discharged without stagnation. Therefore, the increase in the temperature of the bearing pads and the lubricating fluid film can be minimized and the load capacity can be increased.

What is claimed is:

1. A tilting-pad bearing comprising a pad support, a plurality of bearing pads tiltably disposed in surface contact at their arcuate outer peripheral surfaces with an inner surface of the pad support, pad positioning members provided on the pad support so as to be positioned between said bearing pads for positioning circumferential ends of adjacent bearing pads, oil supply ports provided in and longitudinally of the pad positioning members, and oil outlet grooves provided in the pad support parallel with the axis of the rotary shaft adjacent to the pad positioning members of the pad support.

2. A tilting-pad bearing as set forth in claim 1 wherein the pad positioning members each comprises a stud in screw-threaded engagement with the pad support to extend inwardly from an outer peripheral surface of the pad support so that its forward end is positioned between adjacent circumferential ends of the bearing pads, and a position defining member provided on the forward end of the stud for positioning the circumferential ends of the bearing pads.

3. A tilting-pad bearing as set forth in claim 1 wherein the pad positioning members each comprises a stud in screw-threaded engagement with the pad support to extend from the bearing pad towards the pad support so as to be positioned between adjacent circumferential ends of the bearing pads, and a position defining member provided on an end of the stud adjacent to the bearing pads for positioning the circumferential ends thereof.

4. A tilting-pad bearing as set forth either of claims 1 and 2 wherein each of the pad positioning members is formed by a bolt having an axial oil supply passage.

* * * * *